(12) United States Patent
Alessio et al.

(10) Patent No.: US 8,649,775 B2
(45) Date of Patent: Feb. 11, 2014

(54) ACQUISITION OF A VOICE SIGNATURE FOR STATUS TRACKING AND PROOF OF DELIVERY OF SHIPPED GOODS

(75) Inventors: Eduardo Alessio, Austin, TX (US); Pedro Landa, Austin, TX (US)

(73) Assignee: uFollowit, Inc., Austin, TX (US)

( * ) Notice: Subject to any disclaimer, the term of this patent is extended or adjusted under 35 U.S.C. 154(b) by 1194 days.

(21) Appl. No.: 12/344,587

(22) Filed: Dec. 28, 2008

(65) Prior Publication Data

US 2009/0170482 A1 Jul. 2, 2009

Related U.S. Application Data

(60) Provisional application No. 61/017,497, filed on Dec. 28, 2007.

(51) Int. Cl.
H04M 3/42 (2006.01)
(52) U.S. Cl.
USPC ...................................... 455/414.1
(58) Field of Classification Search
USPC .......................................... 455/414
See application file for complete search history.

(56) References Cited

U.S. PATENT DOCUMENTS

| | | | | |
|---|---|---|---|---|
| 5,313,051 A | * | 5/1994 | Brigida et al. | 235/375 |
| 6,433,732 B1 | * | 8/2002 | Dutta et al. | 342/357.46 |
| 6,467,688 B1 | * | 10/2002 | Goldman et al. | 235/472.01 |
| 2001/0043273 A1 | * | 11/2001 | Herrod et al. | 348/220 |
| 2005/0232189 A1 | * | 10/2005 | Loushine | 370/328 |
| 2005/0289008 A1 | * | 12/2005 | Olivier et al. | 705/22 |
| 2007/0005452 A1 | * | 1/2007 | Klingenberg et al. | 705/27 |
| 2008/0133659 A1 | * | 6/2008 | Aldrey et al. | 709/204 |
| 2008/0255758 A1 | * | 10/2008 | Graham et al. | 701/209 |
| 2009/0287483 A1 | * | 11/2009 | Co et al. | 704/231 |

FOREIGN PATENT DOCUMENTS

WO WO 2008/057133 * 5/2008 ............... H04Q 7/20

* cited by examiner

*Primary Examiner* — Kwasi Karikari
(74) *Attorney, Agent, or Firm* — Michael J Williams

(57) ABSTRACT

A method used in the acquisition of a voice signature associated with the status or tracking of shipped goods is provided. The method includes initiating a call and/or data communication between a remote user and/or device and a shipment tracking system and vice versa. The call and/or data communication is then associated with a shipment. A status of the shipment is determined and a time stamp is assigned to the call. A digital voice recording is generated and if a delivery event a voice signature is acquired during the call. The voice signature is stored to the remote tracking system wherein the voice signature is associated with the shipment, shipment status and time stamp. The voice signature is transformed to text, wherein the text is associated with the voice signature. Finally an electronic shipment status based on the voice signature, text associated with the voice signature, the shipment, shipment status and time stamp is provided. The location of the event is acquired via GPS and/or cellular tower servicing the device, location, and or transforming the voice recording of an event into a latitude and longitude location and or town, city, state and/or country of event.

14 Claims, 10 Drawing Sheets

ACQUISITION OF A VOICE SIGNATURE FOR STATUS TRACKING AND PROOF OF DELIVERY OF SHIPPED GOODS

CROSS-REFERENCE TO RELATED APPLICATIONS

The present U.S. Utility Patent Application claims priority pursuant to 35 U.S.C. §119(e) to the following U.S. Provisional Patent Application which is hereby incorporated herein by reference in their entirety and made part of the present U.S. Utility Patent Application for all purposes:

1. U.S. Provisional Application Ser. No. 61/017,497, entitled "SYSTEM AND METHOD FOR PROVIDING VOICE PROOF OF DELIVERY AND TRACKING OF SHIPPED GOODS," filed Dec. 28, 2007, pending.

FIELD OF THE INVENTION

The present invention relates generally to the tracking of shipped goods, and more particularly, a system and method for providing real time voice based location and proof-of-delivery (POD) of shipped goods.

BACKGROUND OF THE INVENTION

The parcel and small package delivery industry has become accustomed to providing a text based proof-of-delivery (POD) service, and in a lesser frequency, a signed POD. Such activities are generally performed with the use of a handheld device equipped with a bar code scanner, where the package identification number is scanned and the consignee name is typed into a parcel delivery record. Sometimes, when the consignee is available and the service provider provides the service, the name of the consignee or a signed POD might be acquired. This type of POD and the use of handheld devices are justified for the sorting, handling and delivery of parcel and small packages, because each route can deliver on the order of tenths or hundreds parcels per route. Hence, the volume justifies the cost of acquiring such POD with such devices and the software that runs on these devices.

For the freight industry, however, such handheld devices are rarely justified since trucks, the most common means of transportation and delivery, usually perform a single stop to delivery a full truck load, or perform a very small number of delivery stops for a Less than a Truck Load (LTL). Therefore, the use of handheld devices in this industry is cost prohibitive and not done. In addition, the $3^{rd}$ party carriers or independent drivers who perform the task of transporting such loads, and hence do not have such handheld devices, nor have the proper training to operate each particular application running on such devices.

The way truck drivers and delivery personnel who delivery loads send the POD to their dispatching areas and customers is generally by two ways.

In the first way, the delivery person calls the dispatching center and verbally reports the date and time of the delivery. The problem with this method is that the verbal report is not typically recorded and is subject to incompleteness, inaccuracies, lateness and/or volatility Alternatively, the delivery person acquires signed the Bill of Lading (BOL) documentation, by the consignee, and returns the BOL by regular mail or small package delivery services back to the shipper. The problem with this method of providing POD is the amount of time required to return the signed BOL to the shipper, plus the expense to do so. This time delay causes long delays to invoice customers and longer delays to collect payment. Other problems include lack of visibility and lack of information to provide customers on the where about of their freight which translates in multiple calls into the shipper's and broker's customer service, costing them hundreds of thousands of dollars per year.

Problems facing the logistics and distribution industries include (1) need to track shipments and provide accurate and reliable POD; (2) lack of visibility of shipments; (3) high costs to track load status; (4) long times to invoice and collect monies; and (5) high costs on customer services (6) high cost to maintain a network of handheld devices as well as the proper versions of the software applications running on them

BRIEF SUMMARY OF THE INVENTION

Embodiments of the present invention are directed to systems and methods that are further described in the following description and claims. Advantages and features of embodiments of the present invention may become apparent from the description, accompanying drawings and claims.

The present invention pertains to fields of logistics, transportation, supply chain, distribution and customs. Particularly, embodiments pertain to the tracking the movement of shipped goods along the supply chain, where shipments, freight, cargo, loads or packages need to be picked up and upon delivery confirmed by a consignee. This tracking and confirmation provides visibility and proof-of-delivery (POD) to the participating parties, the shipper, the broker, the transportation agent and the receiving party.

One embodiment of the present invention provides a method used in the acquisition of load status and of a voice signature POD associated with the status or tracking of shipped goods. The method includes initiating a call between a remote user and a shipment tracking system, either initiated by the driver transporting the good to report the good's status and/or to acquire the POD, or initiated by an automated system that calls the driver to acquire the good's current status and location. The call is then associated with a shipment via a shipping number or other identifier. A status of the shipment is determined and a time stamp is assigned to the call. A digital voice recording and/or a digital voice signature of the POD is acquired during the call. The voice recording and/or signature is stored at the remote tracking system wherein the recording is associated with every event type, this being pickup, delivery, status call, or any other, of the shipment, in conjunction with the shipment status and time stamp as well as event incident exception if any. The voice recording of the voice signature is transformed to text, wherein the text is also associated with the shipment as a visual and readable name of the consignee receiving the freight, which on the tracking service is attached to the original voice recording of the POD associated with the voice signature, the shipment, shipment status and time stamp is provided.

Another embodiment of the present invention provides method of gathering location information associated with a wireless device, terminal and/or phone. This method involves initiating a call between a wireless terminal and a remote tracking system. The location of the wireless terminal is determined. This determination may be done at the wireless terminal using information associated with the cellular infrastructure if the wireless terminal is a cellular phone, GPS information if the wireless terminal is GPS enabled, or location information associated with an IP address when the wireless terminal is a VOIP or WLAN type device. This location information may then be converted to an audible signal such as a series of tones using an application executed within the upper protocol stack of the wireless terminal. The location information may then be transmitted audibly to the remote tracking system during the call. A time stamp and location stamp are produced by the remote tracking system. This set of information is stored to the remote tracking system and is associated with other information that may be part of the call such as shipment information, POD information and other like information.

Other embodiments of the present invention relate to a shipment tracking system. The shipping tracking system includes software instructions that may be executed on a remote server; a delivery network; and one or more communication devices, terminals or wireless terminals. The delivery network picks up, transports and delivers goods associated with the shipment. The wireless device, terminal and/or phone maintained by a user associated with the delivery network, may support a data communication established between the wireless terminal and the shipping tracking system. The data communication may be initiated by either side. This allows the device to provide shipment status and location information associated with the shipment to the tracking system in response to queries from the remote tracking system during a short data communication. Status information may include but it is not limited to a shipment identifier, a shipment status, a time stamp, location, geospatial latitude, geospatial longitude and/or digital voice recording such as a voice signature for a custody transfer of the goods. The remote tracking system stores the status information including the digital voice recording and voice signature text and converts the voice recording to the voice signature text and provides an electronic shipment status based on the shipment status information.

Other embodiments of the present invention relate to a device attached to the freight which through a cellular, WIFI, RF or any other wireless medium, communicates with the shipment tracking system. The shipping tracking system includes a software application operable to generate instructions (data communications or queries) on a remote server. The data communications or queries are delivered to a tracking system locating device (wireless device, terminal and/or phone) attached and/or associated to the freight, cargo, load, package, pallet, etc, The data communication may be initiated by either side. This allows the tracking system locating device to provide shipment status and location information associated with the shipment to the tracking system in response to queries from the remote tracking system during a short data communication. Status information may include but it is not limited to a shipment identifier, a shipment status, a time stamp, location, geospatial latitude, geospatial longitude. Where the user interacts with the tracking system locating device a digital voice recording such as a voice signature for a custody transfer of the goods may also be collected. The remote tracking system stores the status information including the digital voice recording and voice signature text and converts the voice recording to the voice signature text and provides an electronic shipment status based on the shipment status information.

Features and advantages of the present invention will be apparent from the accompanying drawings and from the detailed description that follows.

BRIEF DESCRIPTION OF THE SEVERAL VIEWS OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1:
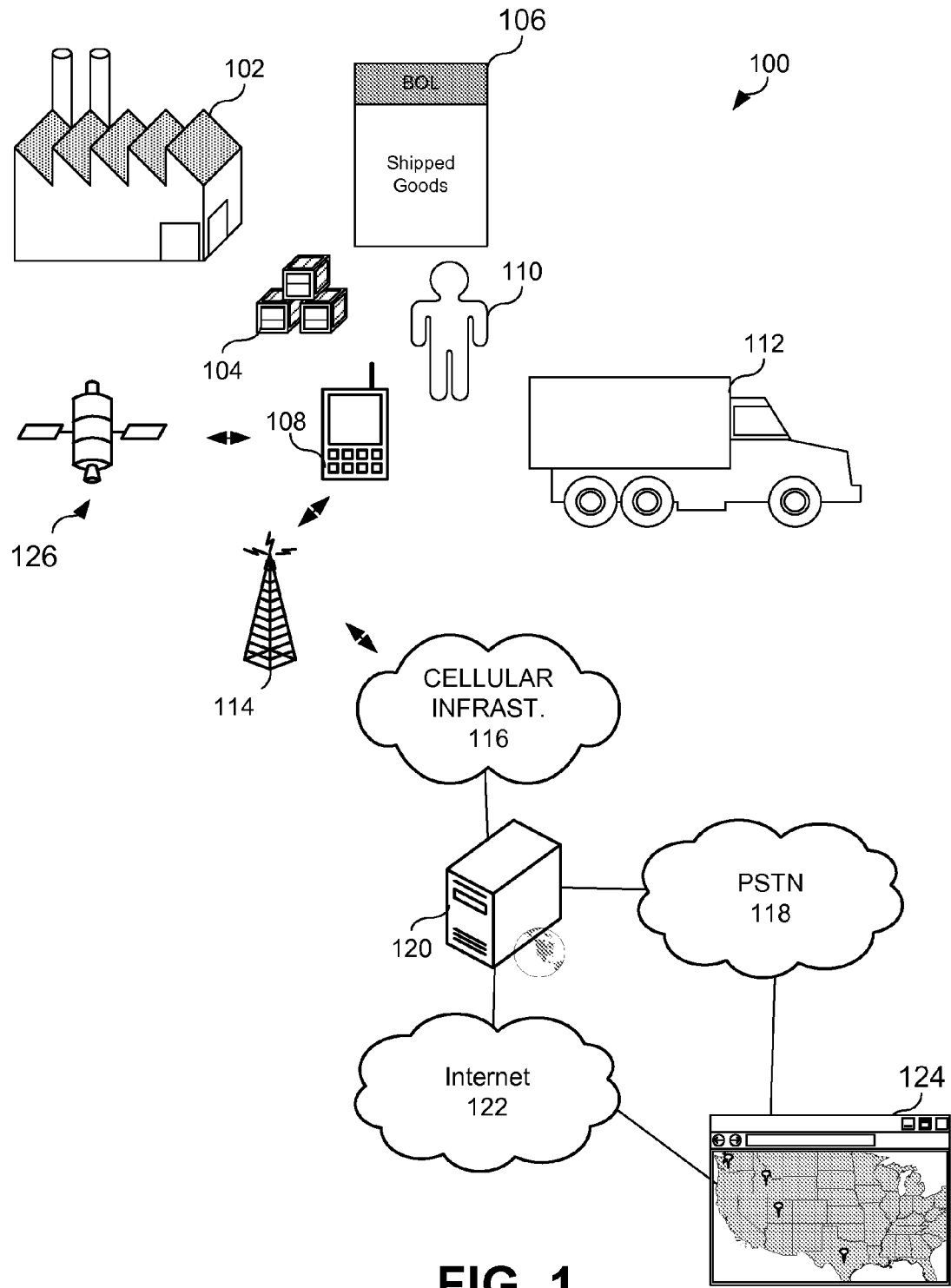
FIG. 1 provides a block diagram associated with the operations of a shipping tracking system provided by embodiments of the present invention.

Preferred embodiments of the present invention are illustrated in the FIGS., like numerals being used to refer to like and corresponding parts of the various drawings.

Embodiments of the present invention address a need for a way to track and provide the proof-of-delivery (POD) of the delivery job, independent of the service provider who is commissioned to the deliver the shipment, independent of the mode of transportation (intermodal transportation), and independent of the number of service providers that participate, trucker, pilot, captain, etc . . . The solution is service provider independent and is highly useful for logistics brokers, who do not own transportation, and for load matching services, who commission the delivery jobs to service providers, as well as shipper, for example those that manufacture goods and subcontract the transportation of those goods into the market Embodiments of the present invention provide a method used in the generation of a voice recording associated with the status or tracking of shipped goods and the acquisition of the Proof of Delivery (POD) when the voice recording is associated with a consignee accepting the goods. The method includes initiating a call between a remote user and a shipment tracking system. The call is then associated with a shipment. A status of the shipment is determined and a time stamp is assigned to the call. A digital voice signature is acquired during the call. The voice signature is stored to the remote tracking system wherein the voice signature is associated with the shipment, shipment status and time stamp. The voice signature is transformed to text, wherein the text is associated with the voice signature. Finally an electronic shipment status based on the voice signature, text associated with the voice signature, the shipment, shipment status and time stamp is provided.

As mentioned previously, a very large percentage of logistic service providers and more particularly, truck drivers do not carry any scanning handheld devices because the cost is prohibitive. Additionally, those applications running on the handheld devices would need to be compatible with the requirements of many diverse tracking systems. However, these individuals do tend to carry a cell phone while performing their daily tasks and keeping in contact with dispatching centers, clients, emergency services, family and friends. Given that most transportation service providers, the individuals performing the POD of the shipment, carry cell phones or have access to other types of phone based communications. Embodiments of the present invention provide a system and method for providing POD of a shipment by allowing the delivery persons to use their cell phones.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or digital, wireless, propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, a Personal digital assistant (PDA), Cell Phone, GPS device or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, Visual Basic, C#, Ajax, HTML, PHP, Web Services or the like and conventional procedural programming languages, such as the "C" programming language or similar programming languages. The program code may execute entirely on the user's computer and/or device, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 provides a block diagram associated with the operations of a shipping tracking system provided by embodiments of the present invention. Shipment tracking system 100 includes a source location 102, shipped goods or shipment 104, a shipping order or Bill of Lading (BOL) 106, a wireless terminal or device 108, a remote user (driver or delivery personnel) 110, a shipping system 112, a cell station 114, cellular infrastructure 116, remote server 120, public switched telephone network (PSTN) 118, internet 122, an electronic status notification 124 (which may be presented as a table and/or visual map), and a locating system such as that provided by a Global Positioning System (GPS) enabled device 108 via satellite 126 A remote tracking system (software application) may be executed on a remote server 120. The remote tracking system may be accompanied by or generate a shipping order or BOL 106 which is supplied to the source location 102 and is associated with shipment 104. The remote tracking system allows user 110 to use a wireless terminal 108 such as a cellular phone, a satellite phone, a WLAN phone or a PSTN phone. A call may be established between wireless terminal 108 and the remote server 120 wherein User 110 may provide shipment status information associated with Shipment 104 to the remote tracking system. This may be in response to a series of prompts from the remote tracking system during the call. The shipment status information may include but should not be limited to a shipment identifier associated with the shipment such as a tracking number, BOL number, account number, load number, etc., a status of the shipment such as shipment pickup, shipment delivery, an intermediate status or an exception status, a time stamp of the call which may be generated automatically by either the wireless terminal or the remote tracking system, a voice signature which may be provided by the user 110 and may identify user 110 as well a provide additional status information, Also a location information of shipment 104 may be provided. This may be provided based on a transponder associated with the shipment or location information provided by the user or automatically generated from information associated with the wireless terminal 108.

Figure 6A:
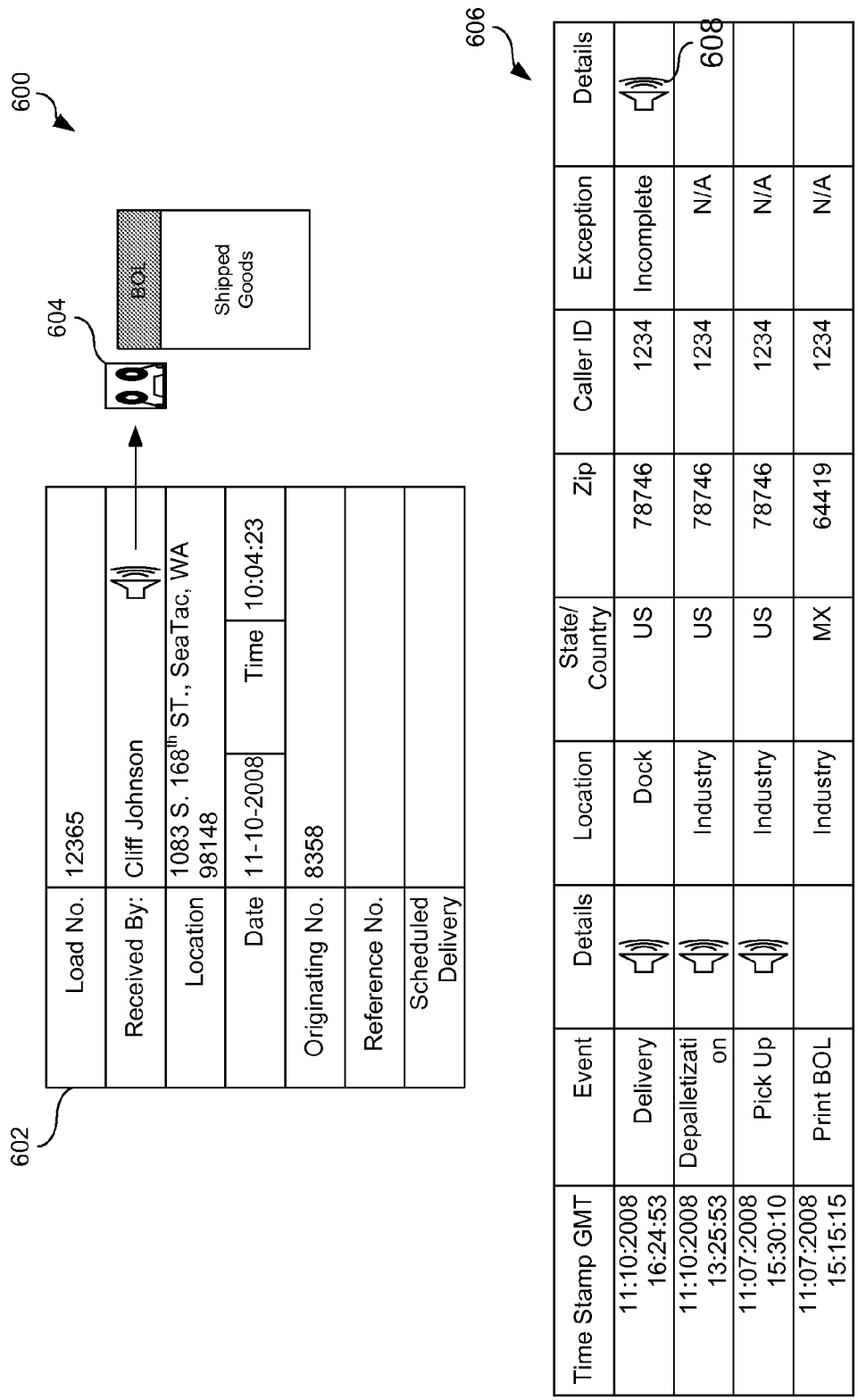
FIG. 6A provides an exemplary view of a detailed tracking page for a specific shipment order number, the page operable to be presented in a browser by the remote tracking system in accordance with embodiments of the present invention.
Figure 6B:
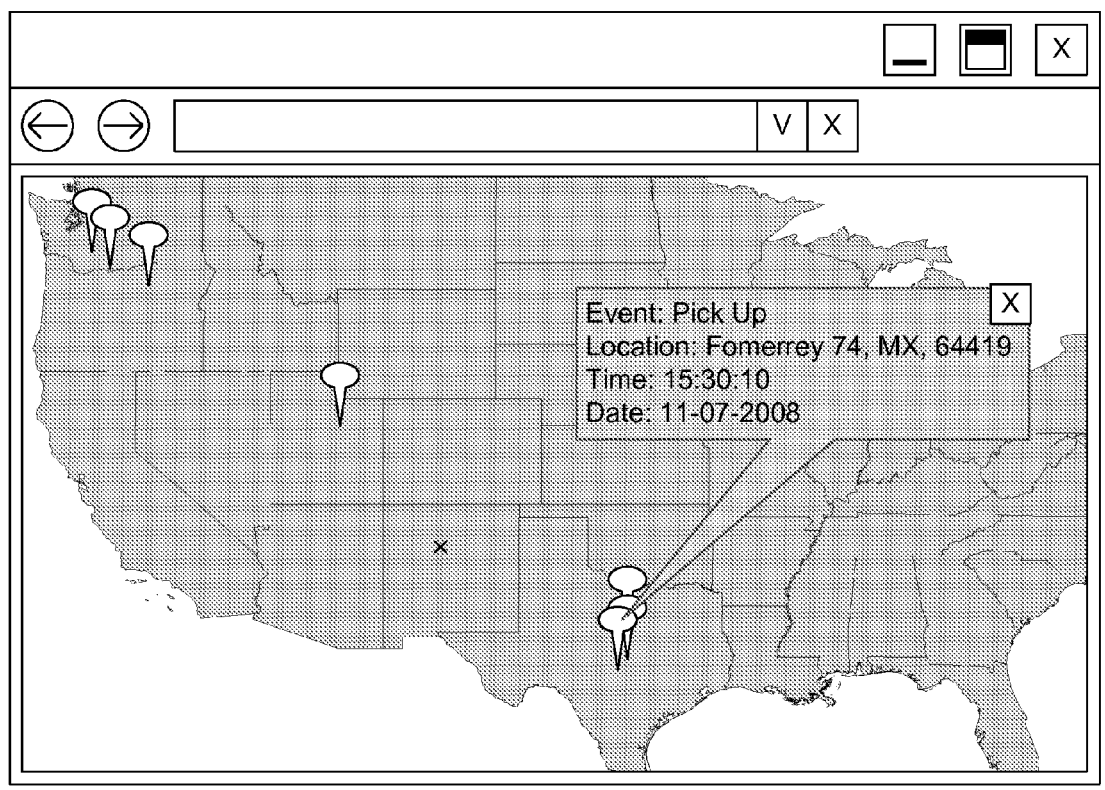
FIG. 6B provides an exemplary view of a graphic representation of a tracking page for a specific shipment, the page operable to be presented in a browser by the remote tracking system in accordance with embodiments of the present invention.

For example user 110 may provide location information verbally or via text in the form of city and state or a street address, city and state wherein this information will be voice recognized (if necessary) and translated to a geographic location that may be visually presented on a map such as that of FIG. 6B. Alternatively the wireless terminal may use cell information associated with the servicing cell when the wireless terminal 108 is a cellular phone or should wireless terminal 108 be GPS equipped this GPS information may be provided during the call as a series of tone information by an application executed within the wireless terminal or may be provided as data during the call. Another possibility would be location information associated with an IP address of a servicing WLAN wireless local area network servicing a wireless terminal 108. Another possibility would be location information associated with the cellular tower servicing the mobile cellular device at the time of the tracking event and or call.

The remote tracking system may store the shipment status information as well as transform the voice signature to text when the text is associated with the voice signature and stored with the shipment status information. An electronic shipment status based on the shipment status information may then be automatically generated and sent to various users. This may be sent in the form of an immediate SMS text message, an email message, a wireless electronic data communication, an update to a web-based tracking system, a facsimile transmission, or a voice transmission.

Figure 2:
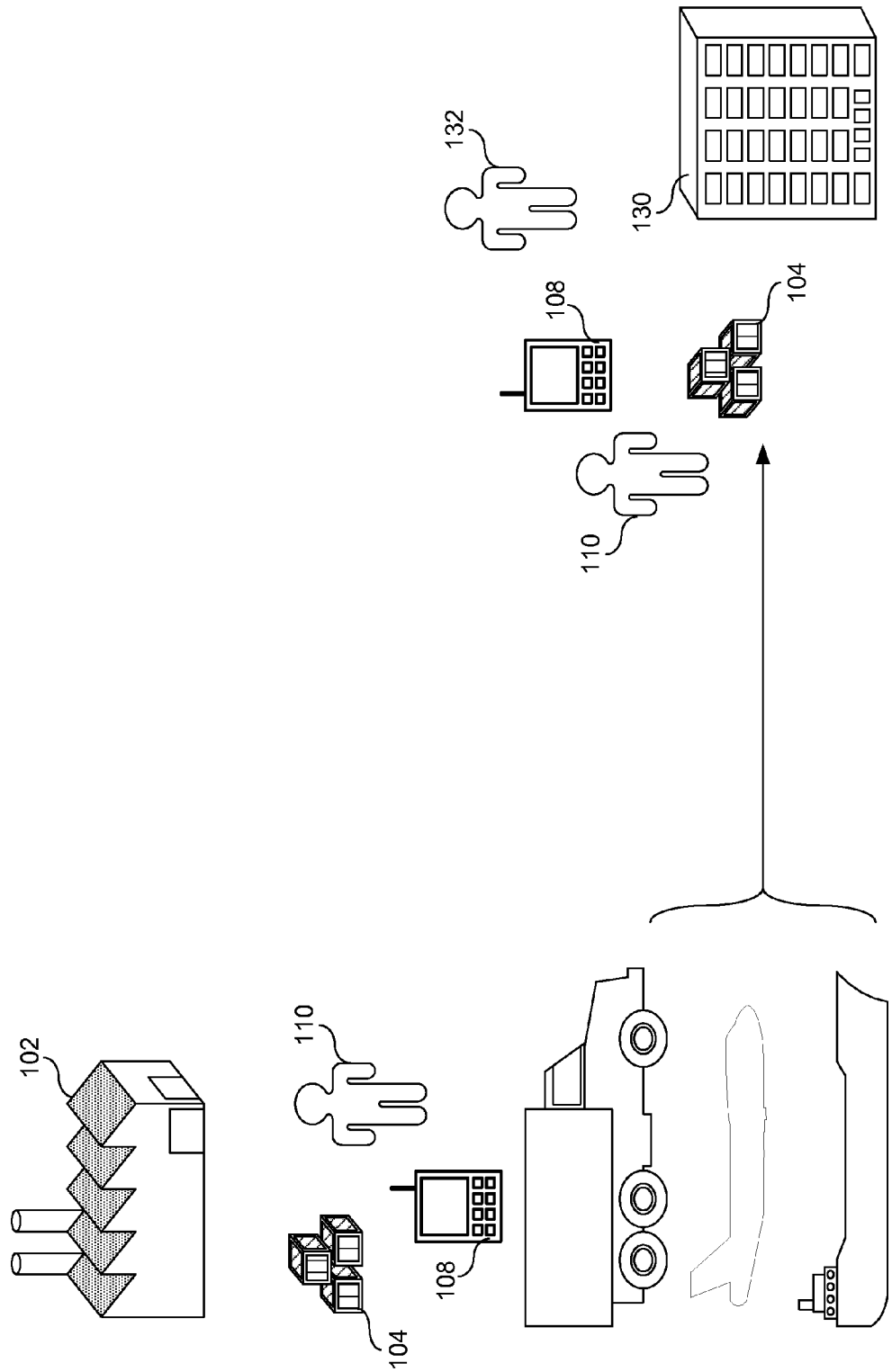
FIG. 2 illustrates that the goods associated with Shipment may be transported via a delivery network using air, sea or land vehicles, such as but not limited to trucks shown, to a destination location in accordance with embodiments of the present invention.

FIG. 2 illustrates that the goods associated with shipment 104 may be transported via a delivery network using air, sea or land vehicles such as trucks 112 to a destination location 130. Here a consignee 132 may be provided with the wireless terminal or device, 108 by the driver or Remote User, 110 in order to provide a voice signature as POD for shipment 104.

Figure 3:
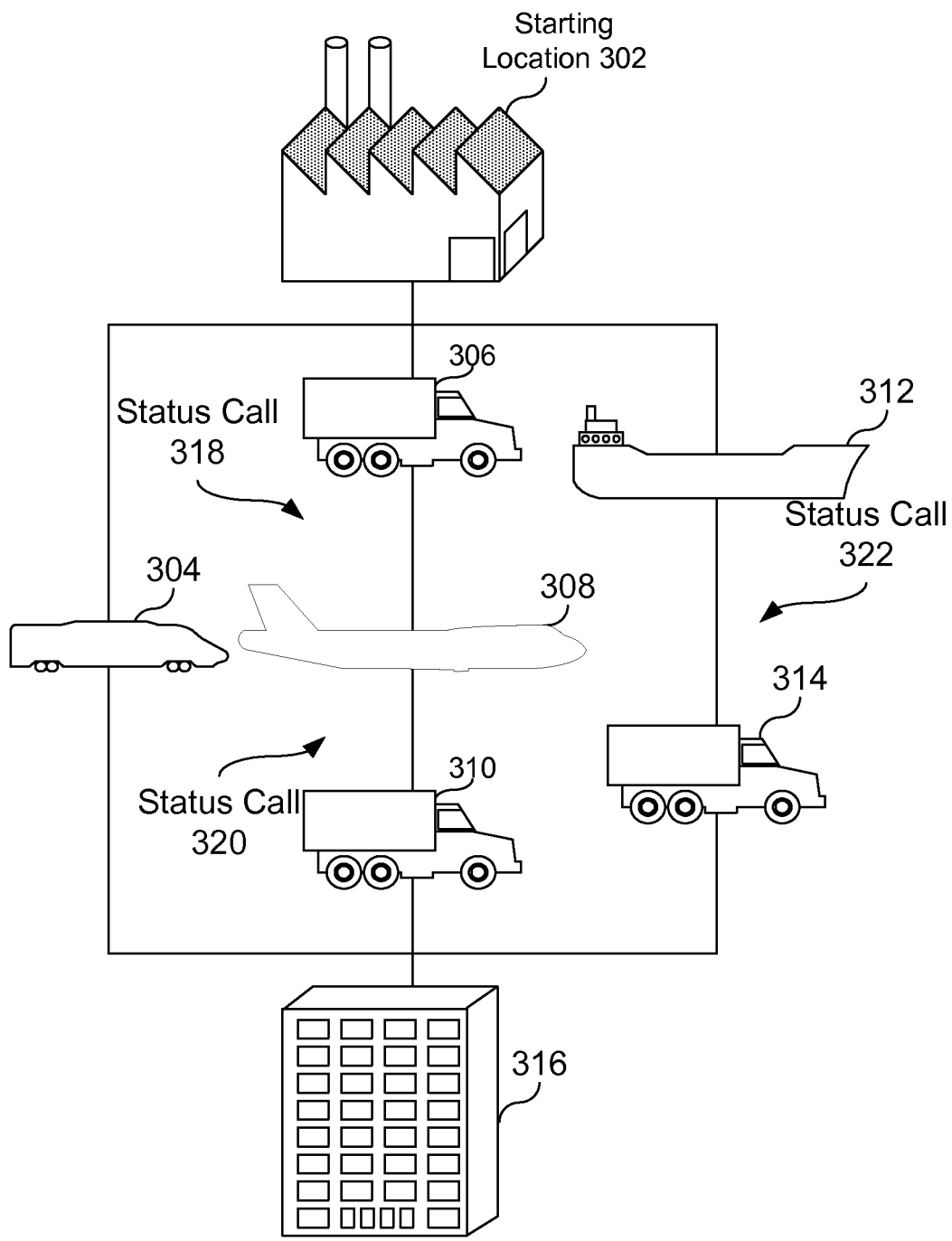
FIG. 3 provides a block diagram of a multi-stage delivery network in accordance with embodiments of the present invention as FIGS. 1 and 2 only illustrate single stage delivery networks.

FIG. 3 provides a block diagram of a multi-stage delivery network as FIGS. 1 and 2 only provided single stage delivery networks. FIG. 3 allows for a delivery network having one or more legs. Shipment 104 may be received at a starting location 302 and may be transported to destination location 316 using a single-leg delivery system, such as that provided by block 304 which may be rail, truck, ship or air based. A second option provided may be a multi-leg delivery system involving air, land and sea transportation or any combination thereof as the different elements of delivery systems of blocks 306, 308 and 310. Blocks 312 and 314 indicated a two-legged delivery system however it should be noted that the delivery networks using the tracking systems provided by embodiments of the present invention need not be limited to one, two or three legs rather any number of legs may be used and these goods may be handed off from one user or driver to another user or driver until they reach their intended destination.

FIGS. 1 and 2 also illustrate various steps necessary to provide voice POD. These diverse steps include: (1) Generating the shipping order (BOL); (2) acquiring the drivers location and or status voice recording or consignee's voice to provide a voice record of the delivery, constituting a voice POD; (3) storing the voice recording and or POD transaction record in a remote tracking server; (4) attaching the shipment order number, time stamp, event type and other optional information to the voice POD and converting the voice POD into readable and printable text; and (5) providing visibility of each voice POD record through a web page on the internet. Some of these steps are optional, depending on the event type, application version and/or customer's needs.

As illustrated in FIGS. 1 and 2, during the delivery process, user 110 (the driver or delivery person), using his/her cell phone or a regular land line telephone, may call or receive a call from a dedicated and remotely hosted phone number. The driver then selects from a telephone voice menu the type of event the driver is reporting, for example, a delivery. Next, the driver types into the phone the numeric digits that identify the freight or load being delivered if not know already by the application Then, the driver presents the phone to user 132 (the recipient or consignee), so that she or he can record her/his name to confirm delivery if a delivery event; if a status event driver records a brief status and/or location. Additionally for every event type driver and or consignee can select, in case of incident, an exception type, for example weather related, traffic, load related, etc, and consequently records a brief status of the exception. At this point the application software of the remote tracking server generates a computerized record with the shipment number, the exact time stamp of the event, the client/shipper ID, the load ID, the event type, and the voice recording for the event, as well as an optional exception type and a short digital recording of the details of such exception. For the purposes of a Delivery event, the voice recording of the consignee is a voice signature and/or proof-of-delivery (POD). This voice recording is transformed through a set of conversion processes by the remote tracking server into readable and printable text, that in conjunction with other parameters, such as telephone Caller ID, physical location, GPS location, and/or optional exception type, etc., instantly provides immediate visibility and tracking of the where about of the freight and any events associated with the shipment of the freight and the freights delivery route. Drivers may still send the BOL paperwork to their clients through their regular slow process, but that information is no longer required to provide the POD, to be able to invoice a job, service customer service calls or to provide visibility and tracking information to internal and external customers. Instead, the BOL paperwork can simply provide supporting evidence in case of a dispute. Additionally, the signed physical BOL can be digitally scanned and/or faxed into the tracking servers and by providing the load ID, such digital version of the BOL document is attached next to the POD of such delivered load into the tracking server; such that the signed BOL can instantly be viewed through the tracking web page along the name and voice signature of the consignee.

Figure 4:
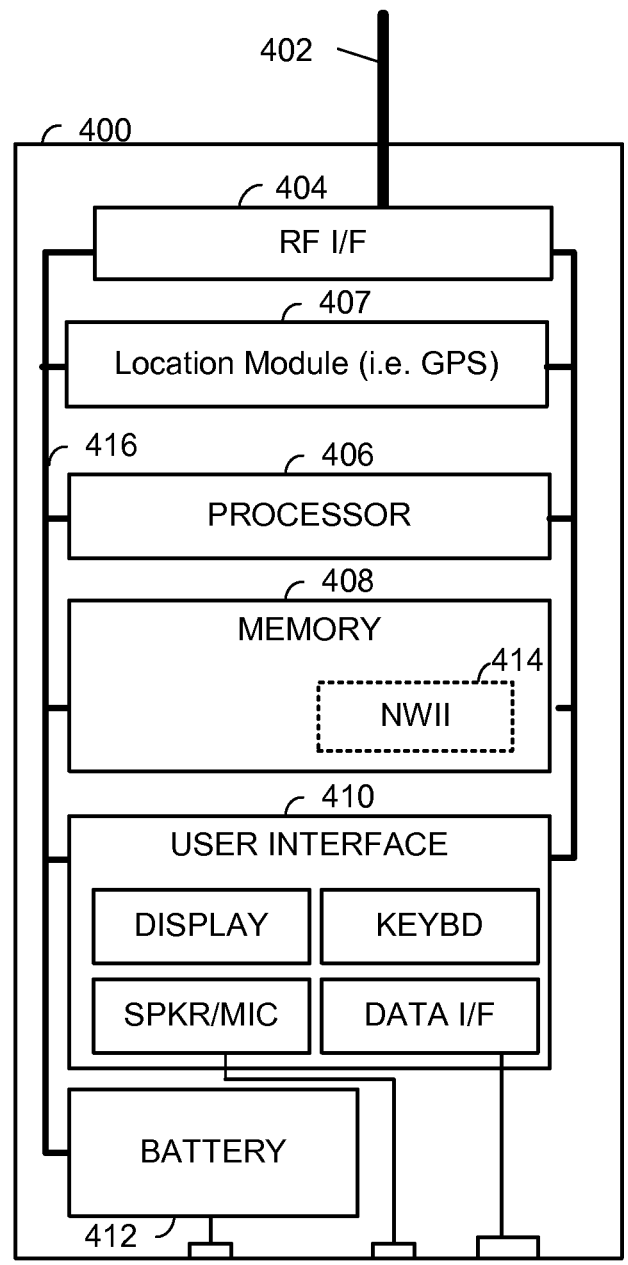
FIG. 4 provides a block diagrams illustrating the typical components of various wireless devices and/or terminals used with embodiments of the present invention.
Figure 5:
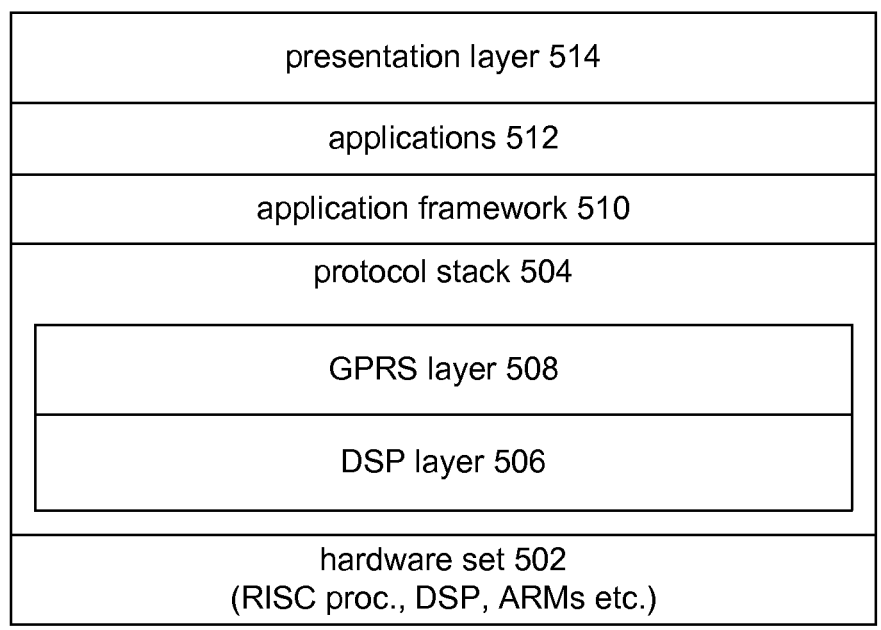
FIG. 5 is a block diagram illustrating the relationship of the differing levels of wireless terminal software (i.e. protocol stack, application framework, and applications)

FIGS. 4 and 5 provide block diagrams illustrating the typical components of various wireless terminals used according to this disclosure. FIG. 4 depicts wireless terminal 400 having a RF unit 404 that supports Bluetooth®, cellular, or like wireless communications. For example, a cellular RF unit supports wireless communications with the cellular network; a satellite RF unit 404 supports satellite based communications. RF unit 404 couple to antennas 402. These antennas 402 may be located internal or external to the case of the wireless terminal 400. Further, in some embodiments, a single RF unit and/or a single antenna may support communications with both the WLAN and the cellular network. Processor 406 may be an Application Specific Integrated Circuit (ASIC) or another type of processor capable of operating the wireless terminal 400 according to this disclosure. Memory 408 includes both static and dynamic components, e.g., DRAM, SRAM, ROM, EEPROM, etc. In some embodiments, the memory 408 may be partially or fully contained upon an ASIC that also includes the processor 406. Module 407 provides location information via GPS, Cell Location or other like means known to those having skill in the art. A user interface 410 includes a display, indicators, a keyboard, a speaker, a microphone, and/or a data interface, and may include other user interface components known to those still in the art. RF interface 404, processor 406, memory 408, and user interface 410 couple via one or more communication buses/links 416. Battery 412 or power port 418 couples to and powers RF interfaces, processor, memory and the user interface. The embodiment of the wireless terminal 400 illustrated in FIG. 4 provides examples of wireless terminal configurations. Many other varied wireless terminal structures may be operated according to the teachings of the present invention.

A single processing device or a plurality of processing devices operably coupled to memory performs the processing duties within the wireless terminal. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions may be described later.

Wire and wireless terminals require a complex software set as illustrated in FIG. 5. These terminals require a communications protocol stack having interoperability with many network vendors' equipment and able to support rich multimedia applications within the constraints of a resource-limited system.

FIG. 5 illustrates the three-key components of software 500 within a wireless terminal. These include the protocol stack 502, application framework 504 and applications 506. Protocol stack 502 is often considered to be the most complex part, however, the interaction between application framework 504 and applications 506 and is equally important. Protocol stack 502 implements the signaling specification and is implemented on digital signal processors and ARMs such as RISC processor and numerous accelerators and co-processors.

Software 500 allows hardware set 508 to achieve certain operations. Protocol stack 502 may further include DSP layer 510, as well as GPRS layer 512. Protocol stack 502, application framework 510, and applications 512 allow the user to interact with the wireless terminal through presentation layer 514. A wireless terminal present in advance communication protocol stack. Protocol stack 502 may be derived from case logs associated with the software operations of the wireless terminal.

FIG. 6A provides an exemplary view of a detailed tracking page for a specific shipment order number. This may be presented within a browser window and indicates the status of a specific shipment. This Status 600 includes voice and text POD information as well as tracking information associated with the shipment. Block 602 provides text information associated with a captured voice signature which has been saved as File 604. This voice information may include order number information, a delivery name of the consignee and the destination address. As shown, the consignee's name, to whom the delivery was made, appears in a readable and printable format, where the consignee's name is linked to the original voice POD. In this manner, the original voice signature can be heard shortly after being recorded or anytime thereafter. Table 606 contains time stamped location, event and exception information. This may include voice or audible recordings as indicated by icons 608, shipment status, event information, location (address, city, state, zip and country), caller or device ID, and exception type and details. Table 606 also show the tracking steps of such shipment order number in chronological order as those tracking events were acquired through the voice POD call steps.

FIG. 6B provides a map generated on a remote server and presented in a web browser by the remote tracking system. Map 610 and the various pin point locations 612 identify various locations and statuses of shipment 104. Each pin may have event type information, location information, and time and date information which may be presented in call-out 614. The pins may be color coded for pick up, delivery and exception information to highlight areas specific events of interest during the tracking of the shipment.

Using embodiments of the present invention for providing voice POD has the advantages of substantially shortening the time to invoice and collect for the shipper, substantially diminishing calls either by the shipper or by the consignee/recipient into customer service in order to know the status of a load delivery hence reducing operational costs, and completely eliminating the calls from dispatching departments to delivery drivers to acquire the status of a delivery job.

If the phone used by the delivery person to obtain the recipient's voice recording is GPS enabled, then the exact position of those deliveries with latitude and longitude can be identified, thus allowing for a matching and verification of the actual physical location of the delivery and the requested location for a delivery.

Additionally, embodiments of the present invention may be used to obtain, record, and store the verbal acceptance of any service. Examples include initiating service contracts with a wide variety of service providers, such as phone service providers, food services and any other service that is remotely requested and cannot be signed for.

Furthermore, embodiments of the present invention may be used for international tracking of loads, the exchange of hands between service provider along the supply chain, and even through customs and revision points.

Embodiments of the present invention provide a system and method that greatly simplifies tracking for the logistics and transportation industry by providing the delivery drivers the ability to acquire POD anywhere at any time and allows anyone who is part of the shipping/distribution/delivery/supply chain/service personnel/crew location/ to access pick up, intermediate status, delivery and any other event information.

Figure 7:
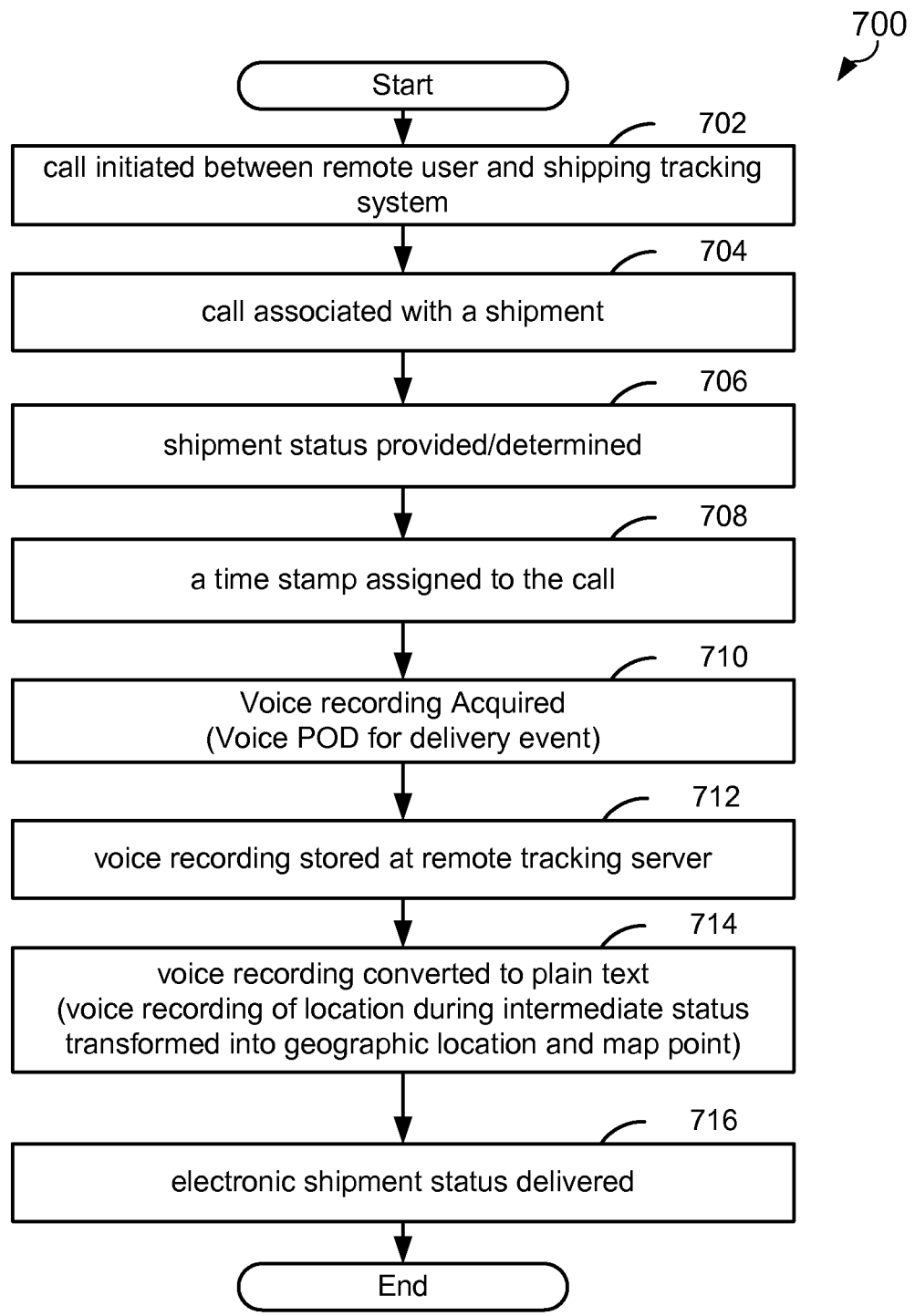
FIG. 7 provides a logic flow diagram illustrating potential methods of tracking shipments in accordance with embodiments of the present invention.

FIG. 7 provides a logic flow diagram illustrating potential methods of tracking shipments in accordance with embodiments of the present invention. Operation 700 began with Block 702 where a call is initiated between a remote user and a shipping tracking system or vice versa. In Block 704, the call may be associated with a particular shipment. In Block 706, a status associated with the shipment may be determined. The status may be a shipment pickup, shipment delivery, shipment intermediate status, or shipment exception status or any other. In Block 708, a time stamp may be assigned to the call. A voice prompt system in Block 710 may acquire a voice signature during the call. This voice signature may be from a driver indicating his identity as well as the status of the shipment. In the instance where the status of the shipment is delivered, the voice POD may be a consignee accepting delivery of the shipment with or without exception information associated with it. The voice signature may be stored to a remote server of the remote tracking system in Block 712. This voice signature again is associated with the shipment, the shipment status and the time stamp. Furthermore Block 714 allows for the voice signature to be converted to plain text where again this text information is associated with both the voice signature and the shipment. Block 716 provides an electronic shipment status based on the voice signature, text associated with the voice signature, shipment, shipment status, and time stamp. This electronic shipment status may be provided to a requester in one of many formats. These formats may include but are not limited to an SMS text message, an email message, an update to a web-based tracking system wherein a user may access the web-based tracking system to see the status, a facsimile transmission, voice transmission a telephone call, a radio call a Multimedia message and/or a pager message The location information may be provided during the call as well. This location information may be based on GPS information, cellular information such as the servicing cell tower and/or antenna servicing the mobile terminal, device or cell phone, geographic area, a voice input wherein the user would provide an address, town, city, state, country and/or zip code location information or some subset thereof Then voice recognition software would translate this into a geographic area and or point in a map such as a specific point associated with the provided location from the voice recording information. This call may be initiated by a dispatcher from the tracking system to a remote user driver when a driver has not checked in or may be initiated from the driver side or remote user side. This information may be stored for tracking purposes and in the event of a delivery as a POD in order to facilitate invoicing and tracking of goods.

Figure 8:
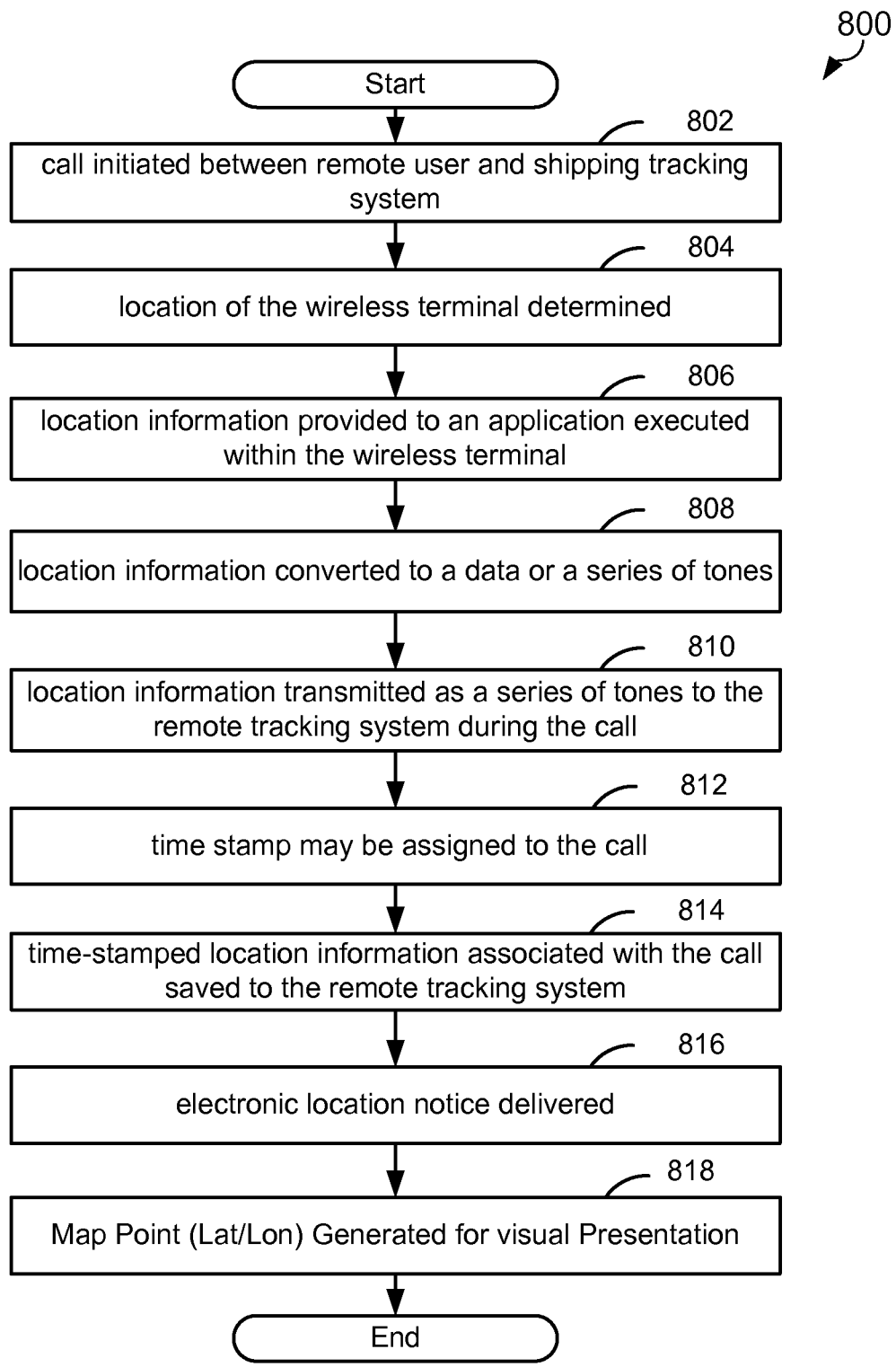
FIG. 8 provides a logic flow diagram of a method for transmitting wireless terminal location information in accordance with embodiments of the present invention.

FIG. 8 provides a logic flow diagram of a method for transmitting wireless terminal location information in accordance with embodiments of the present invention. Operations 800 begin with Block 802 where a call may be initiated using the wireless terminal between a first user and a remote tracking system. In Block 804 location of the wireless terminal may be determined. This location may be determined using GPS, servicing cell information associated with a cellular network, Internet protocol address information associated with a wireless terminal or a VOIP terminal or voice input information. In Block 806 the location information of the wireless terminal is provided to an application executed within the upper layers of the protocol stack. This application in Block 808 converts the location of the wireless terminal to a series of tones. The location information may be then transmitted as a series of tones to the remote tracking system during the call in Block 810. Additionally a time stamp may be assigned to the call based by the remote tracking system in Block 812. This stamp may include both time information and the location information transmitted in Block 810. The time-stamped location information associated with the call may then be saved to the remote tracking system in Block 814. This information may be associated with a shipment tracked by the remote tracking system. Block 818 generates a map point or pin for visual presentation in either the tables of FIG. 6A or map of FIG. 6B. Furthermore an electronic status notification may be generated based on the call in Block 816.

Figure 9:
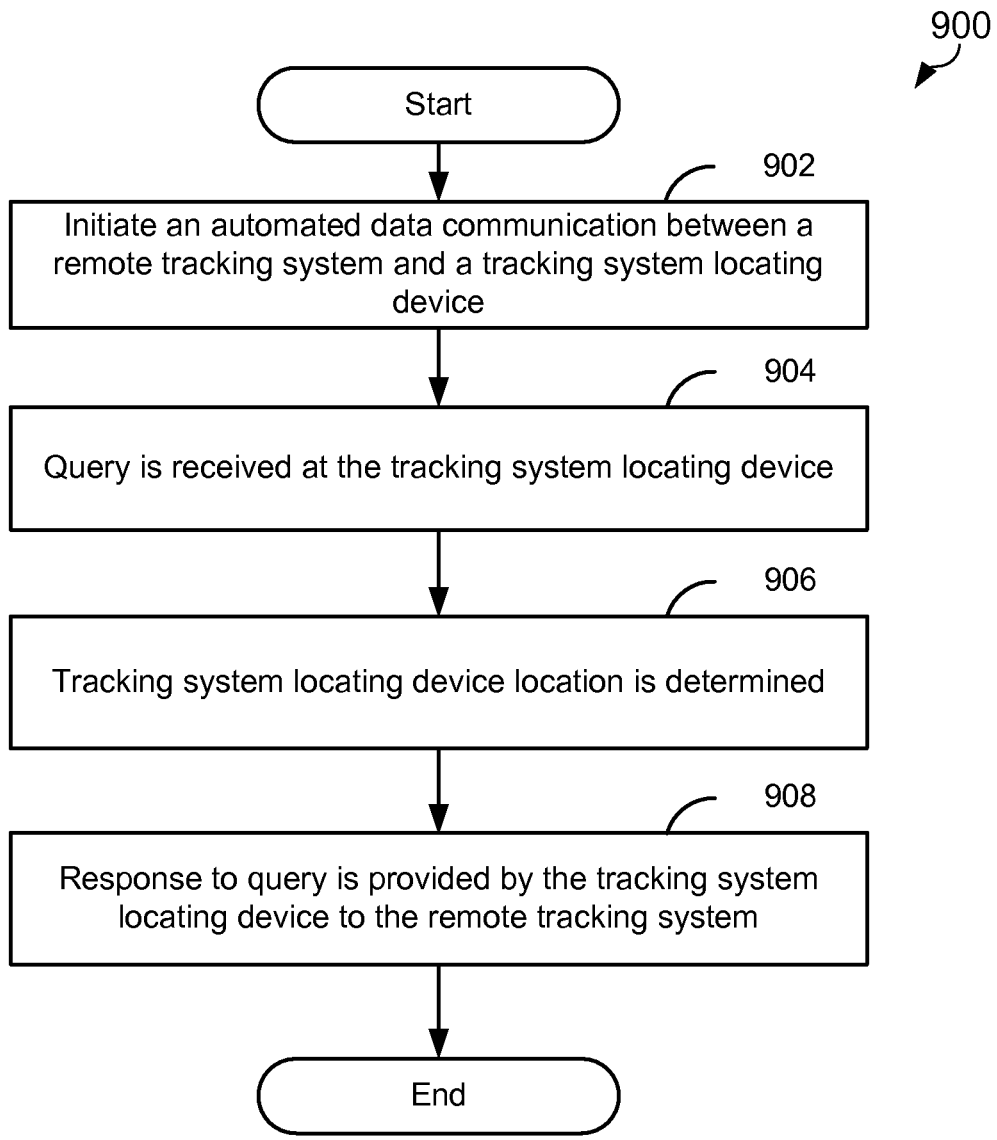
FIG. 9 provides a logic flow diagram illustrating a method of gathering shipment information associated with freight during shipment in accordance with embodiments of the present invention.

FIG. 9 provides a logic flow diagram illustrating a method of gathering shipment information associated with freight during shipment in accordance with embodiments of the present invention. Operations 900 commence with Block 902 initiating an automated data communication between a remote tracking system and a tracking system locating device. This tracking system locating device may be located proximate to the freight such as either being attached to or located on a pallet associated with the freight. In Block 904 a query is received at the tracking system locating device. This query may be generated by the remote tracking system or in an automated fashion from the tracking system locating device itself. In Block 906 an application executed on the tracking system locating device is prompted to determine the tracking system locating device's location. Other information may be determined as well, such as but not limited to the time. In response to the query, in Block 908, the remote tracking system receives a data communication from the tracking system locating device that includes shipment information associated with the freight. The shipment information may include status, timestamp, location information, caller I.D. of the tracking system locating device as well as a voice signature if there is an exception event or delivery event or any change of custody event associated with the freight. This information may be stored to a database by the remote tracking system and presented on demand in either a tabular or visual format such as the tables of FIG. 6A or map with event callouts provided by FIG. 6B.

In summary, the present invention provides a method used in the acquisition of a voice recording associated with the status or tracking of shipped goods. The method includes initiating a call between a remote user and a shipment tracking system. The call is then associated with a shipment. A status of the shipment is determined and a time stamp is assigned to the call. A digital voice signature is acquired during the call. The voice signature is stored to the remote tracking system wherein the voice signature is associated with the shipment, shipment status and time stamp. The voice signature is transformed to text, wherein the text is associated with the voice signature. Finally an electronic shipment status based on the voice signature, text associated with the voice signature, the shipment, shipment status and time stamp is provided.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
   initiating a call between a remote user and a shipment tracking system;
   associating the call with a shipment;
   determining a status of the shipment;
   assigning a time stamp to the call;
   prompting the remote user via an automated voice prompt system to input data as voice or tones;
   extracting the data from the voice or tone inputs, wherein the data is associated with the shipment, shipment status and time stamp;
   acquiring a voice signature during the call;
   storing the voice signature to the remote tracking system wherein the voice signature is associated with the shipment, shipment status and time stamp;
   transforming the voice signature to text, wherein the text is associated with the voice signature; and
   providing an electronic shipment status based on the voice recording, text associated with the voice signature, the data extracted from the voice or tone inputs, the shipment, shipment status and time stamp.

2. The method of claim 1, wherein the call is initiated on behalf of a consignee accepting delivery of the shipment.

3. The method of claim 1, wherein the status comprises at least one status selected from the group comprising: shipment pickup;
   shipment delivery;
   shipment intermediate status; and
   shipment exception status.

4. The method of claim 1, wherein the electronic shipment status is provided in at least one format selected from the group consisting of:
   a SMS text message;
   an email message;
   an update to a web based tracking system;
   a facsimile transmission; and
   a voice transmission.

5. The method of claim 1, wherein location information is:
   received from the remote user and/or a remote device;
   associated with the shipment; and
   included within the electronic shipment status.

6. The method of claim 1, wherein a call is initiated from a dispatching location by the remote tracking system to the remote user.

7. The method of claim 1, further comprising storing the electronic shipment status.

8. The method of claim 1, further comprising:
   storing within a database, information associated with each shipment event, the information comprising a time stamp, event type, location, zip code, caller ID, exception information, delivery details such as voice recording for POD when the event type is a delivery event, a visual representation of readable text of name of consignee; and visually presenting the information on a map by a location of each shipment event.

9. A shipment tracking system comprising:
   a network based remote tracking system executed on a remote server, the remote tracking system operable to generate a shipping order associated with the shipment;
   a delivery network operable to receive, transport and deliver the goods;

an automated voice prompt system which:
receives a call from a remote user;
prompts the remote user to input data as voice, digital data or tones;
extracts the data from the voice, digital data or tone inputs;
at least one wireless terminal, wherein a call may be established between the at least one wireless terminal and the remote tracking system, wherein a user may provide shipment status information associated with the shipment to the remote tracking system in response to prompts from the remote tracking system during the call, wherein the shipment status information comprises:
a shipment identifier associated with the shipment;
a status of the shipment;
a time stamp of the call;
a caller ID associated with the call;
a voice recording;
a text transcription, said text having been transformed from said voice recording;
a location of the shipment;
the remote tracking system operable to:
store shipment status information;
transform the voice signature to text, wherein the text is associated with the voice signature; and
provide an electronic shipment status based on the shipment status information.

10. The shipment tracking system of claim 9, wherein the call is initiated on behalf of a consignee accepting delivery of the shipment.

11. The shipment tracking system of claim 9, wherein the status of the shipment comprises at least one status selected from the group comprising:

shipment pickup;
shipment delivery;
shipment intermediate status; and
shipment exception status.

12. The shipment tracking system of claim 9, wherein the electronic shipment status is provided in at least one format selected from the group consisting of:
a SMS text message;
an email message;
an update to a web based tracking system;
a facsimile transmission: and
a voice transmission.

13. The shipment tracking system of claim 9, wherein location information is:
determined with Global Positioning Satellites (GPS);
determined by identifying a servicing cell associated with the wireless terminal;
determined by identifying an internet protocol address associated with the wireless terminal; or
zip code or detailed location and street address of delivery event.

14. The shipment tracking system of claim 9, wherein shipment status information comprises:
exception information;
a voice recording associated with a delivery event;
a visual or digital representation of a BOL;
a scheduled delivery time; or
optional reference number associated with the delivery event.

\* \* \* \* \*